United States Patent
Staude et al.

(10) Patent No.: US 9,586,542 B2
(45) Date of Patent: Mar. 7, 2017

(54) APPARATUS FOR TRANSMITTING ELECTRICAL SIGNALS TO AND/OR FROM A ROTATABLE COMPONENT OF A MOTOR VEHICLE, STEERING COLUMN MODULE, AND MOTOR VEHICLE

(71) Applicant: VALEO Schalter und Sensoren GmbH, Bietigheim-Bissingen (DE)

(72) Inventors: Sascha Staude, Bietigheim-Bissingen (DE); Rainer Lipfert, Bietigheim-Bissingen (DE); Viktoria Schwarz, Bietigheim-Bissingen (DE); Roland Gruener, Bietigheim-Bissingen (DE); Karl Simonis, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/034,264

(22) PCT Filed: Nov. 3, 2014

(86) PCT No.: PCT/EP2014/073600
§ 371 (c)(1),
(2) Date: May 4, 2016

(87) PCT Pub. No.: WO2015/074856
PCT Pub. Date: May 28, 2015

(65) Prior Publication Data
US 2016/0264072 A1    Sep. 15, 2016

(30) Foreign Application Priority Data
Nov. 22, 2013 (DE) .......................... 10 2013 019 562

(51) Int. Cl.
*B60R 16/027* (2006.01)
*H01R 35/02* (2006.01)

(52) U.S. Cl.
CPC ......... *B60R 16/027* (2013.01); *H01R 35/025* (2013.01); *H01R 2201/26* (2013.01)

(58) Field of Classification Search
CPC .. H01R 35/025; H01R 13/465; H01R 13/641; B60R 16/027
(Continued)

(56) References Cited

U.S. PATENT DOCUMENTS 4,789,342 A * 12/1988 Shitanoki ............. H01R 35/025
                                                      439/15
5,314,344 A *  5/1994 Ida ........................ H02G 11/00
                                                      439/15
(Continued)

FOREIGN PATENT DOCUMENTS

DE      38 78 648 T2    6/1993
DE         4419077 A1  12/1994
(Continued)

OTHER PUBLICATIONS

International Search Report issued in PCT/EP2014/073600 mailed on Feb. 19, 2015 (3 pages).
(Continued)

*Primary Examiner* — Gary Paumen
(74) *Attorney, Agent, or Firm* — Osha Liang LLP

(57) ABSTRACT

The invention relates to an apparatus (2) for transmitting electrical signals to and/or from a rotatable component of a motor vehicle, having a positionally fixed stator (4) which is intended to be installed in a positionally fixed manner in the motor vehicle, and having a rotor (3) which is rotatably mounted on the stator (4) and which is intended to be coupled in a rotationally fixed manner to the rotatable
(Continued)

component of the motor vehicle, wherein the stator (4) has a housing (5) in which a flat cable (14) for transmitting the electrical signals is arranged, wherein a connecting piece (6) which is electrically coupled to the flat cable (14) and is designed to be connected to a corresponding mating piece (15) of the rotatable component is arranged on the rotor (3), and wherein the rotor (3) has a viewing window (11) through which it is possible for a viewer looking from outside the housing (5) to identify a reference element (13) of the flat cable (14) in a neutral position of the rotor (3) with respect to the stator (4), wherein the viewing window (11) is arranged in the region of the connecting piece (6), so that the viewing window (11) is covered by the mating piece (15) in a state in which the connecting piece (6) is connected to the mating piece (15).

7 Claims, 3 Drawing Sheets

(58) Field of Classification Search
USPC .................................. 439/164, 15, 488, 910
See application file for complete search history.

(56) References Cited

U.S. PATENT DOCUMENTS

| | | | | |
|---|---|---|---|---|
| 5,409,389 | A * | 4/1995 | Shibata | H01R 35/025 439/15 |
| 5,562,466 | A | 10/1996 | Kato et al. | |
| 5,683,259 | A * | 11/1997 | Sato | B60R 16/027 439/15 |
| 5,762,507 | A * | 6/1998 | Mochizuki | H01R 35/025 439/15 |
| 5,980,285 | A | 11/1999 | Matsumoto | |
| 7,544,063 | B2 * | 6/2009 | Puskar | H01H 71/02 439/13 |
| 8,167,633 | B1 * | 5/2012 | Wu | H01R 13/6675 439/164 |
| 2001/0036760 | A1 * | 11/2001 | Oishi | B60R 16/027 439/164 |
| 2004/0209504 | A1 * | 10/2004 | Wade | B60R 16/027 439/164 |
| 2008/0014775 | A1 * | 1/2008 | Yoshimura | B60R 16/027 439/164 |

FOREIGN PATENT DOCUMENTS

| | | |
|---|---|---|
| DE | 10 2007 024 167 A1 | 12/2007 |
| EP | 1 149 739 A2 | 10/2001 |
| EP | 1 410 971 A2 | 4/2004 |
| EP | 1 462 296 A2 | 9/2004 |
| EP | 1 468 876 A2 | 10/2004 |
| EP | 2 182 594 A1 | 5/2010 |
| JP | H10-275669 A | 10/1998 |
| JP | 2008-030713 A | 2/2008 |

OTHER PUBLICATIONS

Written Opinion of the International Searching Authority issued in PCT/EP2014/073600 mailed on Feb. 19, 2015 (5 pages).
German Search Report issued in Patent application No. 10 2013 019 562.4 mailed on Mar. 17, 2014 (5 pages).

* cited by examiner

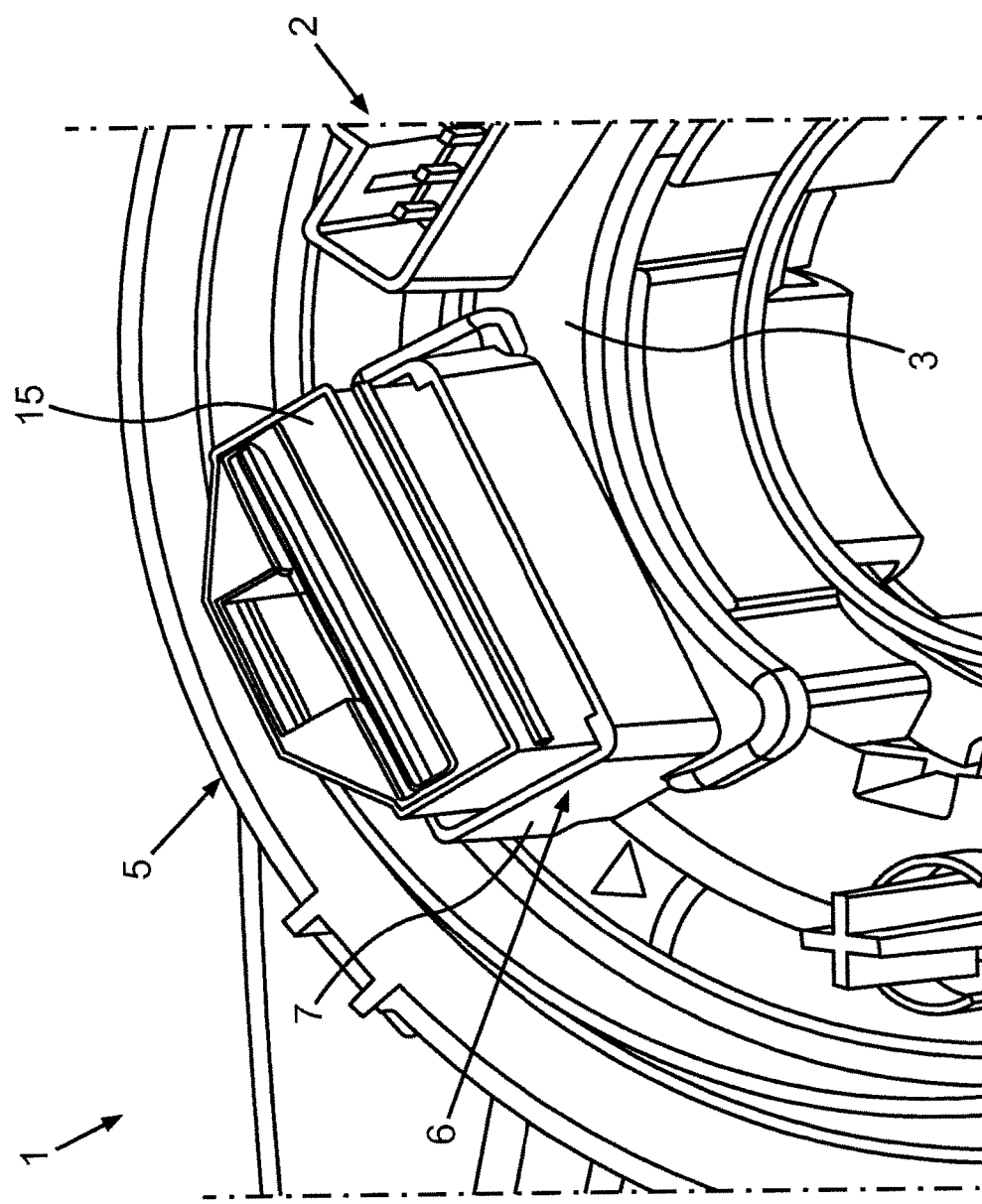

APPARATUS FOR TRANSMITTING ELECTRICAL SIGNALS TO AND/OR FROM A ROTATABLE COMPONENT OF A MOTOR VEHICLE, STEERING COLUMN MODULE, AND MOTOR VEHICLE

The invention relates to an apparatus for transmitting electrical signals to and/or from a rotatable component of a motor vehicle, having a positionally fixed stator which is intended to be installed in a positionally fixed manner in the motor vehicle, and having a rotor which is rotatably mounted on the stator and which is intended to be coupled in a rotationally fixed manner to the rotatable component of the motor vehicle, wherein the stator has a housing in which a flat cable for transmitting the electrical signals is arranged, wherein a connecting piece which is electrically coupled to the flat cable and is designed to be connected to a corresponding mating piece of the rotatable component is arranged on the rotor, and wherein the rotor has a viewing window through which it is possible for a viewer looking from outside the housing to identify a predetermined reference element of the flat cable in a neutral position of the rotor with respect to the stator. The invention also relates to a steering column module having an apparatus of this kind, and also to a motor vehicle having an apparatus of this kind and/or a steering column module of this kind.

Electronic steering column modules for motor vehicles are already known from the prior art. Steering column modules of this kind usually comprise a connecting apparatus or a rotary connector which serve/serves for transmitting electrical signals—control signals and/or supply voltages—between positionally fixed control devices on the one hand and the steering wheel on the other. The known steering column modules usually comprise a positionally fixed component, or a stator, which is/are attached in a positionally fixed manner in the motor vehicle, for example to a casing of the steering column, which casing is arranged fixed to the vehicle body and in which casing the steering shaft is rotatably mounted. A hub part which constitutes a rotor and can be attached in a rotationally fixed manner to the steering wheel is rotatably mounted on the positionally fixed stator. The positionally fixed stator has a housing in which a coil spring or a so-called flat cable is arranged, by means of which coil spring/flat cable the abovementioned electrical signals are transmitted between devices which are located in the steering wheel on the one hand and devices which are arranged in a positionally fixed manner in the vehicle on the other. By way of example, an electric heater in the steering wheel is supplied with electrical energy by means of a flat cable of this kind. Furthermore, it is also possible for an airbag in the steering wheel to be actuated by means of the flat cable. A further example is presented by operator control elements which are integrated in the steering wheel and which are electrically connected by means of the flat cable to control devices which are located outside the steering wheel. In this case, the flat cable usually contains a plurality of electrical lines which are electrically insulated from one another.

A steering column module having steering column-mounted switches is known, for example, from EP 1 462 296 A2. The configuration of a steering column with a positionally fixed casing and a rotary shaft which is rotatably mounted in the casing is known from EP 1 410 971 A2.

When the steering wheel is mounted, the said steering wheel is rotatably connected to the said rotor of the steering column module. This means that the steering wheel is mounted on the steering column and, in the process, is fitted on the steering shaft in such a way that rotation of the steering wheel simultaneously also causes rotation of the rotor of the steering column module. When the steering wheel is mounted, it should also be ensured that the rotor is located in a neutral position relative to the stator. In the prior art, a viewing window is provided in the rotor for this purpose, it being possible for the installation technician to identify a reference element of the flat cable, for example a tape loop of the flat cable, without problems through the said viewing window in the neutral position of the rotor with respect to the stator. Therefore, if the tape loop is located behind the viewing window, the installation technician can assume that the rotor is located in the neutral position or in the starting position with respect to the stator.

A viewing window of this kind is known, for example, from document EP 1 468 876 B1. However, one disadvantage of this prior art can be considered to be the fact that the said viewing window has to be covered again by a transparent material during mounting in order to prevent dirt from entering the interior of the housing. Therefore, an additional mounting step and also an additional transparent material are required, this making the entire mounting process relatively complicated. A further possibility is presented by designing the rotor from a transparent material, for example from plastic, in regions. However, this transparent material is relatively expensive in comparison to conventional materials since relatively stringent requirements are made of the mechanical properties of the material in this case.

Furthermore, an apparatus of the generic type outlined in the introductory part is known from document DE 44 19 077 A1.

The object of the invention is to propose a solution in respect of how the reference element of the flat cable can be identified without a great deal of expenditure in the case of an apparatus of the generic type outlined in the introductory part.

According to the invention, this object is achieved by an apparatus, by a steering column module and also by a motor vehicle having the features according to the respective independent patent claims. Advantageous embodiments of the invention are the subject matter of the dependent patent claims, the description and the figures.

An apparatus according to the invention is designed to transmit electrical signals to and/or from a rotatable component of a motor vehicle and comprises a positionally fixed stator which is intended to be installed in a positionally fixed manner in the motor vehicle, and also comprises a rotor which is rotatably mounted on the stator and which is intended to be connected in a rotationally fixed manner to the rotatable component, in particular to a steering wheel. The stator has a housing in which a flat cable for transmitting the electrical signals is arranged. A connecting piece which is electrically coupled to the flat cable and is designed to be connected to a corresponding mating piece of the rotatable component is arranged on the rotor. The rotor has a viewing window through which it is possible for a viewer, for example an installation technician, looking from outside the housing to identify a predetermined reference element of the flat cable in a neutral position of the rotor with respect to the stator. According to the invention, it is provided that the viewing window is arranged in the region of the connecting piece, so that the viewing window is covered by the mating piece in a state in which the connecting piece is connected to the mating piece.

Accordingly, the viewing window is arranged in the region of the connecting piece in such a way that the viewing window is covered or closed by the mating piece when the connecting piece is connected to the mating piece. In the connected state, the viewing window is preferably completely covered in such a way that the reference element behind the viewing window can no longer be identified. The apparatus according to the invention has the advantage that no additional transparent material is required in order to seal off the viewing window, and therefore sealing off of the viewing window by a transparent material of this kind can be dispensed with. Therefore, expenditure on material and expenditure on mounting are minimal and the reference element of the flat cable can nevertheless be identified by the installation technician through the viewing window without problems. As soon as the steering wheel is mounted, the mating piece is also connected to the connecting piece, and the viewing window to the wound tape cassette is closed by the mating piece.

It has proven particularly advantageous when the connecting piece of the rotor is in the form of a plug socket having a holder which surrounds the connecting piece and into which the mating piece can be inserted in the form of a plug. In this case, the viewing window can be arranged within the said peripheral holder, so that no changes to the mating piece are required so that the viewing window can be covered when the mating piece is inserted. If the mating piece is inserted into the holder, the viewing window is automatically and immediately closed.

A sealing element which is designed to seal off the viewing window is preferably arranged on the connecting piece and/or on the mating piece. Therefore, it is additionally possible to reliably prevent water and/or dirt entering the interior of the housing. A sealing element of this kind can be, for example, a peripheral seal which is arranged on an inner face of the abovementioned holder and/or on an outer face of the plug (mating piece). If the plug is inserted, the sealing element is therefore located between the holder on the one hand and the plug on the other, and can therefore effectively seal off the region of the viewing window.

The abovementioned reference element can be, for example, a tape loop of the flat cable, which tape loop is arranged so as to overlap the viewing window in the neutral position of the rotor. A tape loop of this kind can be reliably identified.

In addition or as an alternative, the flat cable can be provided with an additional marking, such as a correspondingly coloured strip or the like for example, in the region of the reference element—in particular on the said tape loop. A marking of this kind then ensures better visual perception of the reference element and therefore prevents mistakes.

A steering column module according to the invention is designed for installation on a steering column of a motor vehicle and comprises an apparatus according to the invention. The steering column module can be fitted, for example, on the steering column of the motor vehicle. The module can optionally also have at least one steering column-mounted switch.

The motor vehicle according to the invention, in particular a passenger car, comprises an apparatus according to the invention and/or a steering column module according to the invention.

Further features of the invention can be gathered from the claims, the figures and the description of the figures. All of the features and combinations of features mentioned above in the description, and also the features and combinations of features mentioned below in the description of the figures and/or shown only in the figures, may be used not only in the respectively specified combination but also in other combinations or on their own.

The invention will now be explained in greater detail on the basis of a preferred exemplary embodiment and with reference to the appended drawings, in which:

FIG. 3 is a schematic illustration of the connecting piece in the state in which it is connected to the mating piece.

Figure 1:
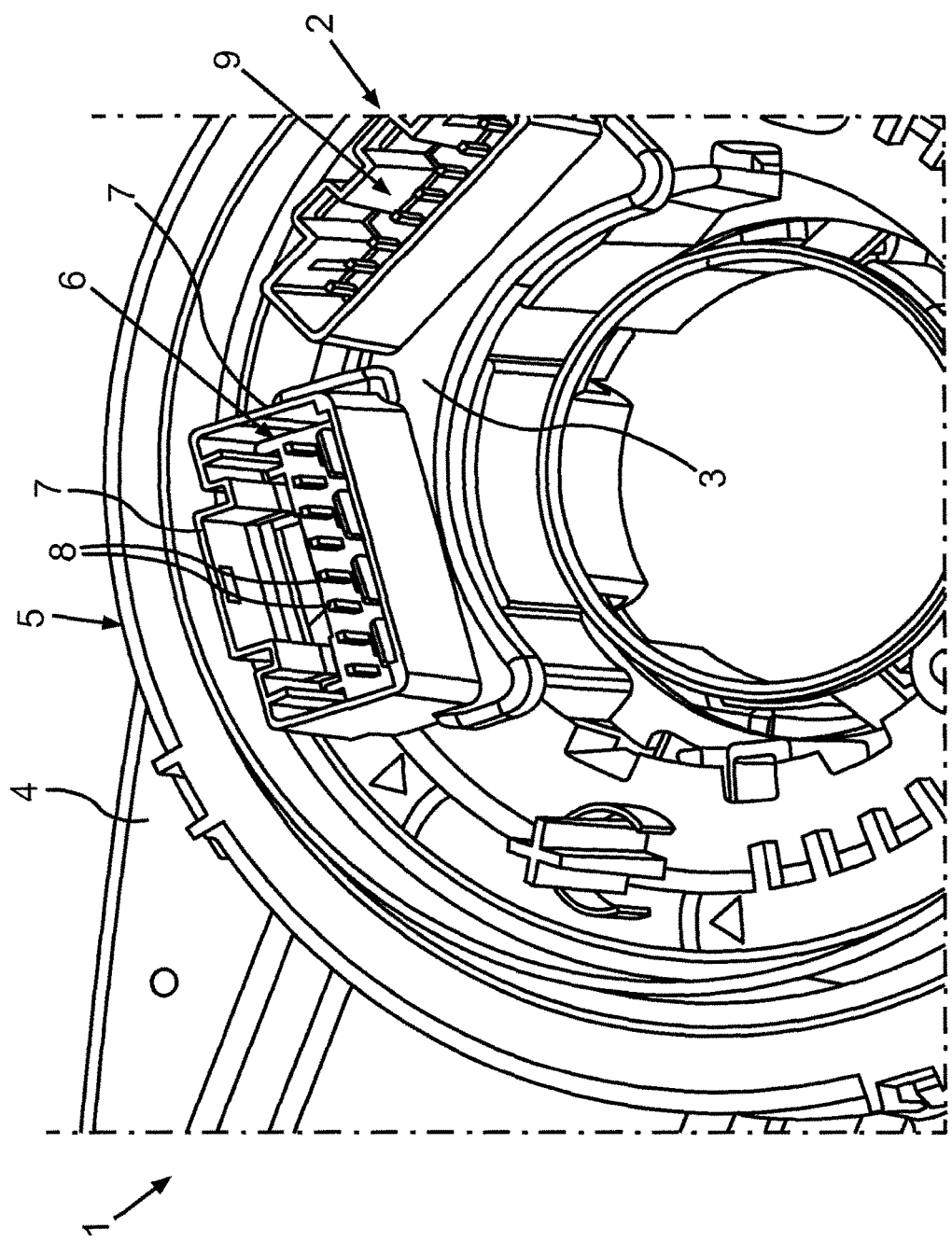
FIG. 1 is a schematic illustration of a steering column module having an apparatus according to one embodiment of the invention.

A steering column module 1 which is illustrated in FIG. 1 can be installed on a steering column of a passenger car. The steering column module 1 comprises an apparatus 2 which serves to transmit electrical signals—specifically control signals and/or supply voltages—between control devices of the motor vehicle on the one hand and electronic components which are accommodated in the steering wheel on the other. The apparatus 2 comprises a rotor 3 which constitutes a hub part which can be fitted on the steering shaft of the steering column. The apparatus 2 further comprises a positionally fixed stator 4 which is arranged on the steering column in a positionally fixed manner. Therefore, when the steering wheel is rotated, only the rotor 3 rotates relative to the stator 4.

The stator 4 comprises a housing 5 in which a flat cable or a coil spring is arranged. The electrical signals are transmitted by means of the flat cable.

The flat cable is electrically coupled to a connecting piece 6 which is arranged on the rotor 3. In this case, the connecting piece 6 is designed in the form of a plug receptacle or plug socket and has a holder 7 which surrounds the connecting piece 6 and which is of peripheral design and serves to receive a mating piece or a plug. Electrical contact elements 8 by means of which the electrical signals are transmitted are arranged within the holder 7.

At least one further plug receptacle 9 can also be arranged on the rotor.

Figure 2:
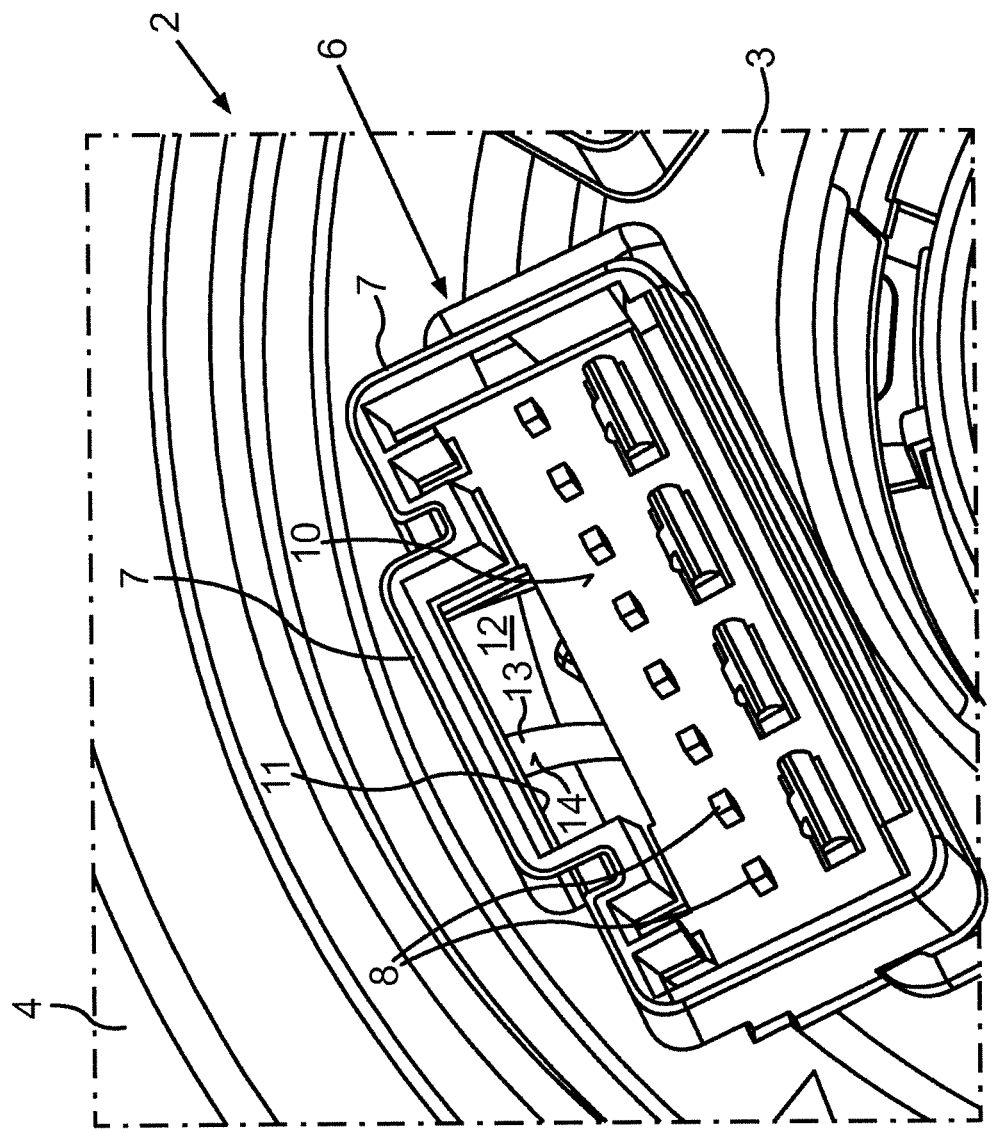
FIG. 2 is a schematic illustration of a connecting piece of the apparatus.

The connecting piece 6 is shown on an enlarged scale in FIG. 2. As is clear from FIG. 2, a rectangular viewing window 11 through which it is possible to look into an interior space 12 in the housing 5 from outside is formed within the connecting piece 6, specifically on a floor 10 of the connecting piece 6. The viewing window 11 is in the form of a cutout or a passage opening in the floor 10 of the connecting piece 6. A reference element 13 of the flat cable 14 can be identified through the viewing window 11 in a neutral position of the rotor 3 with respect to the stator 4. In the exemplary embodiment, a tape loop of the flat cable 14 is used as reference element 13. The said tape loop can optionally be provided with an additional marking.

If a mating piece 15 is inserted into the holder 7 according to FIG. 3 and thereby connected to the connecting piece 6 when the steering wheel is mounted, the viewing window 11 is covered by the mating piece 15. In this case, the viewing window 11 is completely closed, so that the reference element 13 can no longer be identified. A sealing element (not illustrated) can optionally also be used, it then being possible for the said sealing element to be arranged on the mating piece and/or on the holder 7. A sealing element then ensures an additional sealing effect and therefore reliable sealing off of the viewing window 11 on account of its elastic design.

A viewing window 11 of this kind having an associated reference element 13 can optionally also be used in the at least one further plug receptacle 9 of the rotor 3. Therefore, at least two viewing windows 11 of this kind can be provided, which viewing windows are arranged in respective connecting pieces 6, 9 of the rotor 3 and are covered by the respective mating piece 15 when the connecting piece 6, 9 is connected.

In addition or as an alternative to a tape loop, a bead can also be used as reference element 13 for detecting the position. This bead can also be provided with an additional marking if desired.

The invention claimed is:

1. An apparatus for transmitting electrical signals to and/or from a rotatable component of a motor vehicle, comprising:
   a positionally fixed stator installed in a positionally fixed manner in the motor vehicle;
   a rotor which is rotatably mounted on the stator and which is coupled in a rotationally fixed manner to the rotatable component of the motor vehicle,
   wherein the stator has a housing in which a flat cable for transmitting the electrical signals is arranged, wherein a connecting piece which is electrically coupled to the flat cable and is connected to a corresponding mating piece of the rotatable component is arranged on the rotor,
   wherein the rotor has a viewing window through which it is possible for a viewer looking from outside the housing to identify a reference element of the flat cable in a neutral position of the rotor with respect to the stator, and
   wherein the viewing window is arranged in the region of the connecting piece, so that the viewing window is covered by the mating piece in a state in which the connecting piece is connected to the mating piece.

2. The apparatus according to claim 1, wherein the viewing window is arranged within a holder which surrounds the connecting piece and into which the mating piece can be inserted.

3. The apparatus according to claim 1, wherein a sealing element for sealing off the viewing window is arranged on the connecting piece and/or on the mating piece.

4. The apparatus according to claim 1, wherein the viewing window is arranged so as to overlap a tape loop of the flat cable as reference element in the neutral position.

5. A steering column module installed on a steering column of a motor vehicle, having an apparatus according to claim 1.

6. A motor vehicle having an apparatus according to claim 1.

7. A motor vehicle having a steering column mobile according to claim 5.

* * * * *